US011822172B2

(12) United States Patent
Abe et al.

(10) Patent No.: US 11,822,172 B2
(45) Date of Patent: Nov. 21, 2023

(54) LIGHT CONTROL SHEET AND LIGHT CONTROL DEVICE

(71) Applicant: TOPPAN Inc., Tokyo (JP)

(72) Inventors: Sohei Abe, Taito-ku (JP); Keisuke Fukuhara, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 0 days.

(21) Appl. No.: 17/533,893

(22) Filed: Nov. 23, 2021

(65) Prior Publication Data

US 2022/0082881 A1    Mar. 17, 2022

Related U.S. Application Data

(63) Continuation of application No. PCT/JP2020/019868, filed on May 20, 2020.

(30) Foreign Application Priority Data

May 23, 2019    (JP) .................................. 2019-096886

(51) Int. Cl.
*G02F 1/1333*    (2006.01)
*G02F 1/1343*    (2006.01)
*G02F 1/1339*    (2006.01)

(52) U.S. Cl.
CPC .... *G02F 1/133308* (2013.01); *G02F 1/13392* (2013.01); *G02F 1/13439* (2013.01); *G02F 1/133388* (2021.01)

(58) Field of Classification Search
CPC ............. G02F 1/1333; G02F 1/133302; G02F 1/133305; G02F 1/133308;
(Continued)

(56) References Cited

U.S. PATENT DOCUMENTS

2006/0291030 A1*  12/2006  Niiyama ........... G02F 1/133502
                                                      359/237
2021/0394504 A1*  12/2021  Otsuka .................. G02F 1/1316

FOREIGN PATENT DOCUMENTS

JP              06-95129 A      4/1994
JP          2002328378    * 11/2002   ........... G02F 1/1339
(Continued)

OTHER PUBLICATIONS

Patent Translate JP 2002328378.*
(Continued)

*Primary Examiner* — Thoi V Duong
(74) *Attorney, Agent, or Firm* — Oblon, McClelland, Maier & Neustadt, L.L.P.

(57) ABSTRACT

A light control sheet including a light control sheet body having a front surface and a back surface, the light control sheet body including a first film including a transparent electrode layer, a second film including a transparent electrode layer, a liquid crystal layer formed between the first and second films, and a sealant covering an edge portion of the liquid crystal layer. The second film has a second film contact surface which includes a portion in contact with the liquid crystal layer, and further includes a second film outer peripheral part on which the sealant is formed, the second film outer peripheral part is extended along the edge portion of the liquid crystal layer, and when viewed in a first direction from the front surface to the back surface, the second film outer peripheral part does not overlap the first film or the liquid crystal layer.

20 Claims, 7 Drawing Sheets

(58) Field of Classification Search
CPC ............. G02F 1/133388; G02F 1/1334; G02F 1/1339; G02F 1/13392; G02F 1/1343; G02F 1/13439
See application file for complete search history.

(56) References Cited

FOREIGN PATENT DOCUMENTS

| JP | 2004-093873 | * | 3/2004 | ........... G02F 1/1333 |
| --- | --- | --- | --- | --- |
| JP | 3105679 U | | 9/2004 | |
| JP | 2017-187775 A | | 10/2017 | |
| JP | 2018-065540 A | | 4/2018 | |
| JP | 2018-097021 A | | 6/2018 | |
| JP | 6405442 B1 | | 10/2018 | |

OTHER PUBLICATIONS

International Search Report dated Aug. 25, 2020 in PCT/JP2020/019868, filed May 20, 2020, 8 pages (with English Translation).

* cited by examiner

LIGHT CONTROL SHEET AND LIGHT CONTROL DEVICE

CROSS-REFERENCE TO RELATED APPLICATIONS

The present application is a continuation of International Application No. PCT/JP2020/019868, filed May 20, 2020, which is based upon and claims the benefits of priority to Japanese Application No. 2019-096886, filed May 23, 2019. The entire contents of all of the above applications are incorporated herein by reference.

BACKGROUND OF THE INVENTION

Field of the Invention

The present invention relates to a light control sheet and a light control device including the light control sheet.

Discussion of the Background

A light control sheet includes two transparent films and a liquid crystal layer located between the transparent films. Each transparent film includes a transparent electrode layer. In the light control sheet, an orientation state of liquid crystal molecules is changed by applying a voltage between the transparent electrode layers. The orientation state of the liquid crystal molecules may be, for example, a state in which the light incident on the light control sheet is scattered and a state in which the light incident on the light control sheet is transmitted (see, for example, JP 2017-187775 A).

The light control sheet is attached to a light-transmitting support. The support may be, for example, a window glass of a building or a moving body. The light control sheet attached to the support is separately covered with a sealant at an end portion of the light control sheet so that the liquid crystal layer is not exposed to the outside air. This configuration suppresses deterioration in characteristics of the liquid crystal layer due to contact between the liquid crystal layer and moisture (see, for example, JP 6405442 B).

SUMMARY OF THE INVENTION

According to an aspect of the present invention, a light control sheet includes a light control sheet body having a front surface and a back surface opposite to the front surface, the light control sheet body including a first film having the front surface and including a transparent electrode layer, a second film having the back surface and including a transparent electrode layer, a liquid crystal layer formed between the first film and the second film, and a sealant covering an edge portion of the liquid crystal layer. The second film has a second film contact surface which includes a portion in contact with the liquid crystal layer, and further includes a second film outer peripheral part on which the sealant is formed, the second film outer peripheral part is extended along the edge portion of the liquid crystal layer, and when viewed in a first direction from the front surface to the back surface, the second film outer peripheral part does not overlap the first film or the liquid crystal layer, and the second film outer peripheral part faces a second direction opposite to the first direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
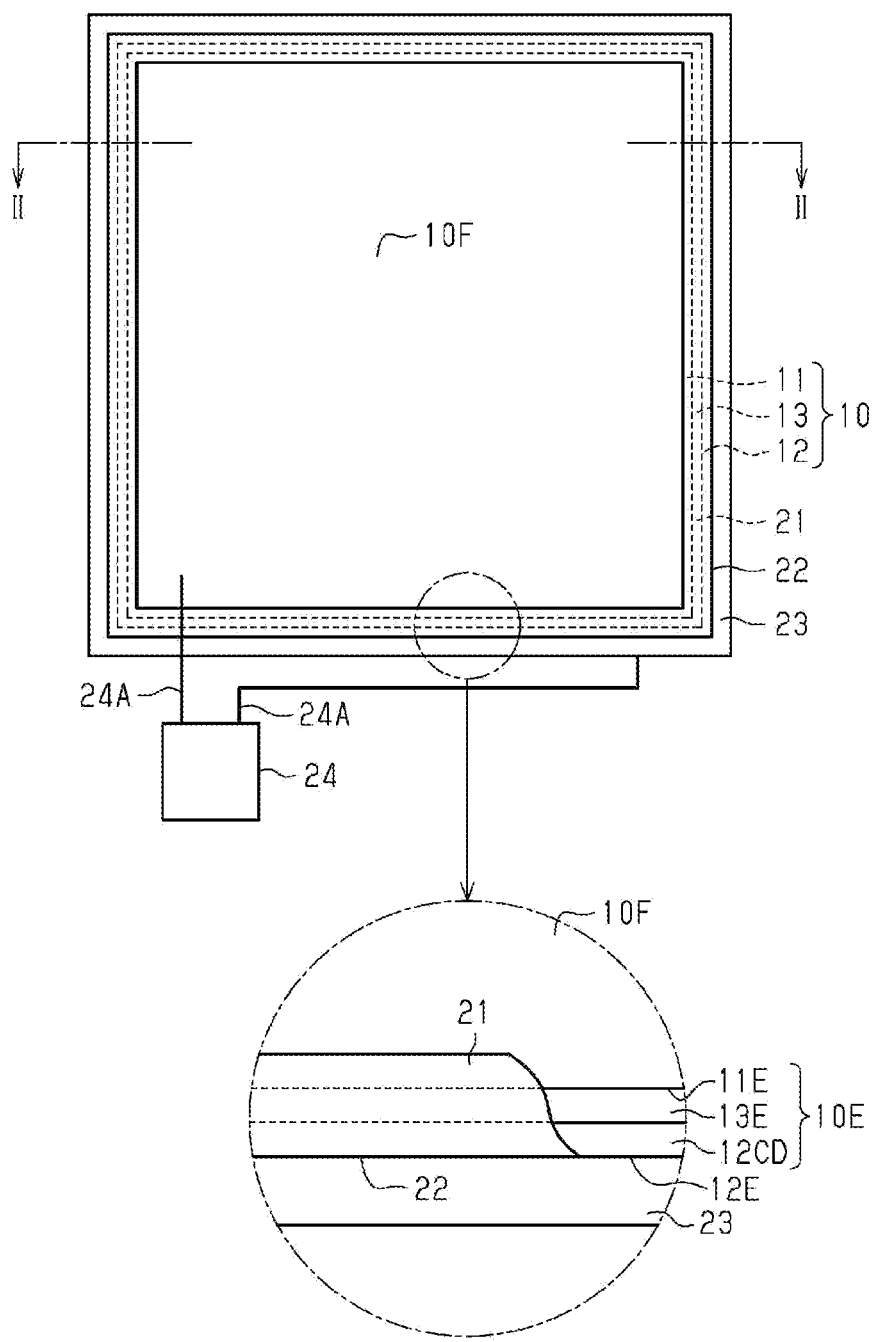
FIG. 1 is a plan view illustrating an embodiment of a light control device with part thereof shown enlarged.

The embodiments will now be described with reference to the accompanying drawings, wherein like reference numerals designate corresponding or identical elements throughout the various drawings.

A light control device and a light control sheet according to an embodiment will be described with reference to FIGS. 1 and 2. In FIG. 1, for convenience of describing an end surface of each layer of the light control sheet, a part of a sealant is shown, in a cut-out state, by a break line, in the enlarged portion included in FIG. 1.

Light Control Device

As shown in FIG. 1, the light control device includes a light control sheet 10, a sealant 21, a transparent adhesive layer 22, a transparent support 23, and a driving unit 24. The light control sheet 10 may have, for example, a rectangular shape when viewed from a position facing the light control sheet 10. The light control sheet 10 is attached to the transparent support 23 via a transparent adhesive layer 22 interposed between the light control sheet 10 and the transparent support 23.

The light control sheet 10 can be made into a geometric shape such as a circular shape or an indefinite shape, in addition to the rectangular shape. The shape of the light control sheet 10 may be curved or flat.

The transparent adhesive layer 22 has a light-transmitting property of allowing visible light to be transmitted therethrough and adhesiveness for adhering the light control sheet 10 and the transparent support 23. The material for forming the transparent adhesive layer 22 is not particularly limited as long as the material is transparent and adhesive. The transparent adhesive layer 22 may be, for example, composed of an acrylic adhesive, a silicone-based adhesive, an epoxy-based adhesive, or the like. An example of the transparent adhesive layer 22 is an OCA film (Optical Clear Adhesive film).

The transparent support 23 may be, for example, a window glass of a moving body such as a vehicle or aircraft. Further, the transparent support 23 may be, for example, a window glass or a screen of a building such as a house, a station or an airport, a partition installed in an office, or a display window installed in a store.

The transparent support 23 may have various shapes such as flat, curved, and indefinite shapes. The material for forming the transparent support 23 is not particularly limited as long as the material is transparent and can support the light control sheet 10. Examples of the material for forming the transparent support 23 include glass, acrylic resins, and polycarbonate resins.

The driving unit 24 is connected to the transparent electrode layers 11A and 12A (see FIG. 2) included in the light control sheet 10. The driving unit 24 converts an output voltage of a DC constant voltage power source or an output voltage of an AC power source into a driving voltage of the light control sheet 10 and applies the driving voltage to the light control sheet 10.

The light control sheet 10 is configured to be able to change its transmittance for visible light. The type of the light control sheet 10 is classified into a normal type and a reverse type. The normal type light control sheet 10 has a relatively high transmittance during application of the driving voltage. The normal type light control sheet 10 has a relatively low transmittance when the driving voltage is not applied. The reverse type light control sheet 10 has a relatively low transmittance during application of the driving voltage. The reverse type light control sheet 10 has a relatively high transmittance when the driving voltage is not applied.

Light Control Sheet

As shown in FIG. 1, the light control sheet 10 includes a first film 11, a second film 12, and a liquid crystal layer 13. The liquid crystal layer 13 is held between the first film 11 and the second film 12.

As shown by the enlarged portion included in FIG. 1, the first film 11 includes a front surface 10F of the light control sheet 10 and a first film end surface 11E which is an end surface of the first film 11. The second film 12 includes a second film end surface 12E which is an end surface of the second film 12, and a second film outer peripheral part 12CD located at a peripheral portion of the second film 12. The peripheral portion of the second film 12 is an end portion of the second film 12, that is, a portion having a frame shape including the outermost periphery, when viewed from a position facing the front surface 10F of the light control sheet 10. The liquid crystal layer 13 includes a liquid crystal end surface 13E which is a surface of an edge portion of the liquid crystal layer 13. The edge portion of the liquid crystal layer 13 is a portion that is located between a pair of surfaces facing each other in a thickness direction of the liquid crystal layer 13 and has a frame shape along an outer periphery of the liquid crystal layer 13.

When the light control sheet 10 is viewed from a position facing the front surface 10F of the light control sheet 10, the entire liquid crystal end surface 13E protrudes from the first film end surface 11E. When the light control sheet 10 is viewed from the position facing the front surface 10F, the liquid crystal end surface 13E does not overlap the first film 11 and has a shape facing the position facing the front surface 10F on an entire periphery of the first film 11. That is, the liquid crystal end surface 13E does not have a portion hidden by the first film 11 when viewed from a viewpoint facing any position on the outermost periphery of the first film 11. In other words, the liquid crystal end surface 13E does not overlap the first film 11, that is, is located outside the first film 11, when viewed in a direction substantially perpendicular to the front surface 10F.

The electrical connection between the two transparent electrode layers 11A and 12A can also be suppressed by the amount by which the liquid crystal end surface 13E faces a position facing the front surface 10F, that is, by the amount by which the liquid crystal end surface 13E projects outward from the first film 11.

When the light control sheet 10 is viewed from a position facing the front surface 10F of the light control sheet 10, the second film outer peripheral part 12CD protrudes from the liquid crystal layer 13. When the light control sheet 10 is viewed from a position facing the front surface 10F, the second film outer peripheral part 12CD does not overlap the first film 11 or the liquid crystal layer 13, and has a shape facing the position facing the front surface 10F on an entire periphery of the liquid crystal end surface 13E. That is, the second film outer peripheral part 12CD does not have a portion hidden by the liquid crystal end surface 13E even when viewed from a viewpoint facing any position on the outermost periphery of the liquid crystal end surface 13E in contact with the second film 12.

A sheet end portion 10E is formed by the first film end surface 11E, the liquid crystal end surface 13E, and the second film outer peripheral part 12CD. The sheet end portion 10E is an edge portion of the light control sheet 10. The sheet end portion 10E is covered with the sealant 21. The sealant 21 covers a peripheral portion of the front surface 10F of the light control sheet 10 and the entire sheet end portion 10E, and is in close contact with them. The peripheral portion of the front surface 10F of the light control sheet 10 is a portion having a frame shape including the outermost periphery of the front surface 10F when viewed from a position facing the front surface 10F. The sealant 21 has high gas barrier properties to the atmosphere containing moisture, oxygen, and the like, and has low water absorbing properties to moisture in the atmosphere, rainwater, and the like.

The sealant 21 is formed of a thermosetting resin or a photosetting resin. The sealant 21 may be formed of, for example, any one selected from the group consisting of an acrylic resin, a polystyrene resin, a silicone-based resin, and an epoxy-based resin. Examples of the acrylic resin include polypropylene, polyurethane, polymethyl methacrylate, and methacryl styrene copolymers. Examples of the polystyrene resin include polystyrene, a styrene acrylonitrile copolymer, and a styrene butadiene acrylonitrile copolymer. The material for forming the sealant 21 is preferably an acrylic resin from the viewpoint of obtaining high adhesion to the first film 11, the second film 12, and the liquid crystal layer 13 and obtaining a low molding temperature. Further, the material for forming the sealant 21 is preferably an acrylic resin from the viewpoint of obtaining high bending strength and high tensile strength in forming the edge portion of the light control sheet 10. In other words, the material for forming the sealant 21 is preferably an acrylic resin. Covering the sheet end portion 10E of the light control sheet 10 with a sealant 21 formed of an acrylic resin makes it possible to obtain an edge portion of the light control sheet 10 having high bending strength and high tensile strength. The edge portion of the light control sheet 10 is a portion having a frame shape including the outermost periphery of the light control sheet 10 when viewed from a position facing the front surface 10F.

Figure 2:
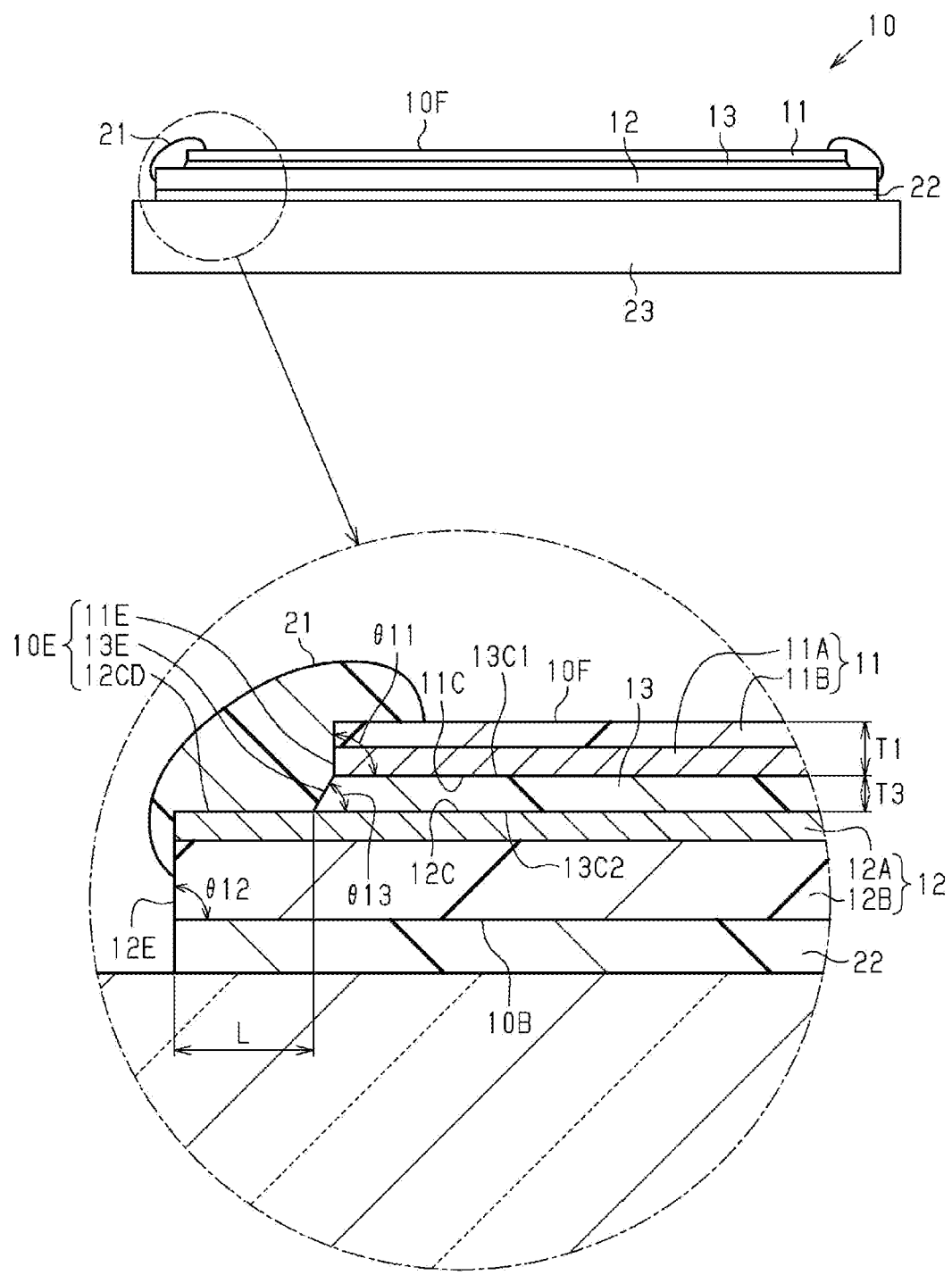
FIG. 2 is a cross-sectional view taken along line II-II in FIG. 1.

As shown in FIG. 2, the first film 11 is a multilayer body including a transparent electrode layer 11A and a transparent support film 11B. A transparent electrode layer 12A is connected to the driving unit 24.

The first film 11 includes the front surface 10F of the light control sheet 10, the first film end surface 11E, and a first film contact surface 11C. The first film end surface 11E is a surface that connects the front surface 10F to the first film contact surface 11C. An angle θ11 formed by the first film end surface 11E and the first film contact surface 11C is approximately 90°.

The first film contact surface 11C is located on the opposite side to the front surface 10F in the first film 11. The first film contact surface 11C is in contact with a first liquid crystal contact surface 13C1 of the liquid crystal layer 13. The first film 11 has a thickness T1 of 50 μm or more and 500 μm or less, for example, 100 μm.

The liquid crystal layer 13 includes the first liquid crystal contact surface 13C1, a second liquid crystal contact surface 13C2, and the liquid crystal end surface 13E. The liquid crystal end surface 13E is a surface that connects the first liquid crystal contact surface 13C1 and the second liquid crystal contact surface 13C2. That is, the liquid crystal end surface 13E is a surface that connects the first liquid crystal contact surface 13C1 to the second liquid crystal contact surface 13C2. In cross section perpendicular to the front surface 10F, an angle θ13 formed by the liquid crystal end surface 13E and the second liquid crystal contact surface 13C2 is less than 90°. The liquid crystal layer 13 has a thickness T3 of 10 μm or more and 100 μm or less, for example, 20 μm or less.

The liquid crystal layer 13 contains liquid crystal molecules. Examples of liquid crystal molecules include any one selected from the group consisting of those based on Schiff bases, azo types, azoxy types, biphenyls, terphenyls, benzoic acid esters, tolan types, pyrimidines, cyclohexanecarboxylic acid esters, phenylcyclohexanes, and dioxanes. Note that the liquid crystal layer 13 can contain a dye that has a predetermined color and has little influence on how the liquid crystal molecules move based on whether the driving voltage is applied to the liquid crystal layer 13.

The type in which the liquid crystal composition is held is one selected from the group consisting of a polymer network type, a polymer dispersion type, and a capsule type. The polymer network type includes a polymer network having a three-dimensional network in a continuous liquid crystal composition. In the polymer network type, the liquid crystal composition contained in the liquid crystal layer 13 is held in voids of the polymer network. The polymer dispersion type has a large number of isolated voids in the polymer network and holds the liquid crystal composition in the voids dispersed in the polymer network. The capsule type holds an encapsulated liquid crystal composition in the polymer network.

The second film 12 is a multilayer body including the transparent electrode layer 12A and a transparent support film 12B. A transparent electrode layer 12A is connected to the driving unit 24.

The second film 12 includes a back surface 10B of the light control sheet 10, the second film end surface 12E, and a second film contact surface 12C. The second film end surface 12E is a surface that connects the back surface 10B to the second film contact surface 12C. An angle θ12 formed by the second film end surface 12E and the back surface 10B is 90°. The second film contact surface 12C is located on the opposite side to the back surface 10B in the second film 12. The second film contact surface 12C includes a surface in contact with the second liquid crystal contact surface 13C2.

That is, a part of the second film contact surface 12C is in contact with the second liquid crystal contact surface 13C2.

A region of the second film contact surface 12C that protrudes from the liquid crystal layer 13, when viewed from a position facing the front surface 10F, is the second film outer peripheral part 12CD.

When viewed from a position facing the front surface 10F, the second film outer peripheral part 12CD is located along the edge portion of the liquid crystal layer 13, does not overlap the first film 11 or the liquid crystal layer 13, and has a shape facing the position facing the front surface 10F. A width L of the second film outer peripheral part 12CD, when viewed from a position facing the front surface 10F, is greater than or equal to a sum of the thickness T1 of the first film 11 and the thickness T3 of the liquid crystal layer 13. The width L of the second film outer peripheral part 12CD is a distance between the edge of the second liquid crystal contact surface 13C2 and the edge of the second film 12, when viewed from a position facing the front surface 10F.

The ease of covering as described above can be increased by the amount by which the width of the second film outer peripheral part 12CD is greater than or equal to the sum of the thickness T1 of the first film 11 and the thickness T3 of the liquid crystal layer 13. When the sealant 21 is provided from a position facing the front surface 10F of the light control sheet 10, it becomes easy to provide the sealant 21.

As described above, the first film end surface 11E, the liquid crystal end surface 13E, and the second film outer peripheral part 12CD form the sheet end portion 10E of the light control sheet 10.

For example, a plurality of light control sheets 10 may be cut out from one large sheet including the large first film 11, the large second film 12, and the large liquid crystal layer 13 held therebetween. The sheet end portion 10E is formed by removing, for example, a peripheral portion of the first film 11 and a peripheral portion of the liquid crystal layer 13 in each of the cut-out light control sheets 10. The peripheral portion of the first film 11 is a portion having a frame shape including the outermost periphery of the first film 11 when viewed from a position facing the front surface 10F. The peripheral portion of the liquid crystal layer 13 is a portion having a frame shape including the outermost periphery of the liquid crystal layer 13 when viewed from a position facing the front surface 10F.

When removing each peripheral portion, first, at the peripheral portion of the first film 11, a cutting blade penetrates into the light control sheet 10 in a direction facing the front surface 10F, so that the first film 11 and the liquid crystal layer 13 are cut. Next, in the light control sheet 10, the cutting blade penetrates toward a boundary surface between the liquid crystal layer 13 and the second film 12, and a cut portion of the first film 11 and a cut portion of the liquid crystal layer 13 are separated from the second film 12. At this time, the sheet end portion 10E is formed of the cut surfaces. The cut surfaces have a cutting mark generated during cutting. That is, the sheet end portion 10E has a cutting mark. The cutting mark may be, for example, a deformation on the front surface 10F or the second film end surface 12E, or a scratch on the sheet end portion 10E. The deformation on the front surface 10F or the second film end surface 12E is caused by pressing of the cutting blade. Scratches on the sheet end portion 10E are caused by passage of the cutting blade.

Instead of the cutting blade, a laser can be used. When a laser is used instead of the cutting blade, a cutting mark is generated by laser irradiation or laser passage. For example, the deformation on the front surface 10F or the second film end surface 12E may be caused by laser irradiation. A fusing mark at the sheet end portion 10E is caused by passage of the laser.

The liquid crystal layer 13 is held between the transparent electrode layer 11A of the first film 11 and the transparent electrode layer 12A of the second film 12. The transparent electrode layers 11A and 12A are inorganic or organic layers which are light-transmitting and conductive. The transparent electrode layers 11A and 12A may be formed of, for example, any one selected from the group consisting of tin-doped indium oxide, tin oxide, fluorine-doped tin oxide, tin oxide, zinc oxide, carbon nanotubes, poly (3,4-ethylenedioxythiophene), and a silver alloy thin film.

The transparent support films 11B and 12B are made of transparent resin or glass. The transparent support films 11B and 12B are colorlessly transparent films that allow visible light to be transmitted therethrough, or colored transparent films that allow a part of visible light to be transmitted therethrough. The transparent support films 11B and 12B may be formed of, for example, any one selected from the group consisting of polyethylene-terephthalate, polyethylene-naphthalate, polycarbonate, polypropylene, polystyrene, acrylic resin, nylon-based resin, polyurethane, polyethylene, polyvinyl alcohol, polyvinyl chloride, polyimide, polysulfone, cycloolefin polymer, and triacetyl cellulose.

The first film 11 and the second film 12 may have a functional layer other than the transparent electrode layers 11A and 12A and the transparent support films 11B and 12B.

An example of the functional layer protects the liquid crystal layer 13 and the transparent electrode layers 11A and 12A. These functional layers which protect the liquid crystal layer 13 and the transparent electrode layers 11A and 12A are a gas barrier layer and an ultraviolet barrier layer. The gas barrier layer is located between the transparent support film 11B and the transparent electrode layer 11A and between the transparent support film 12B and the transparent electrode layer 12A. An example of the functional layer contributes to the control of light-transmitting properties. These functional layers which contribute to the control of light-transmitting properties are an orientation layer and a polarizing layer. The orientation layer is located between each of the transparent electrode layers 11A and 12A and the liquid crystal layer 13. The polarizing layer is located between the transparent support film 11B and the transparent electrode layer 11A and between the transparent support film 12B and the transparent electrode layer 12A. An example of the functional layer enhances the strength, heat resistance, and the like of the light control sheet 10. This functional layer is a hard coat layer or the like. The hard coat layer is located on front surfaces of the transparent support films 11B and 12B. Further, an example of the functional layer may be a layer which enhances the adhesion between the layers in the first film 11 and the second film 12.

Connection Structure With Driving Unit

Figure 3:
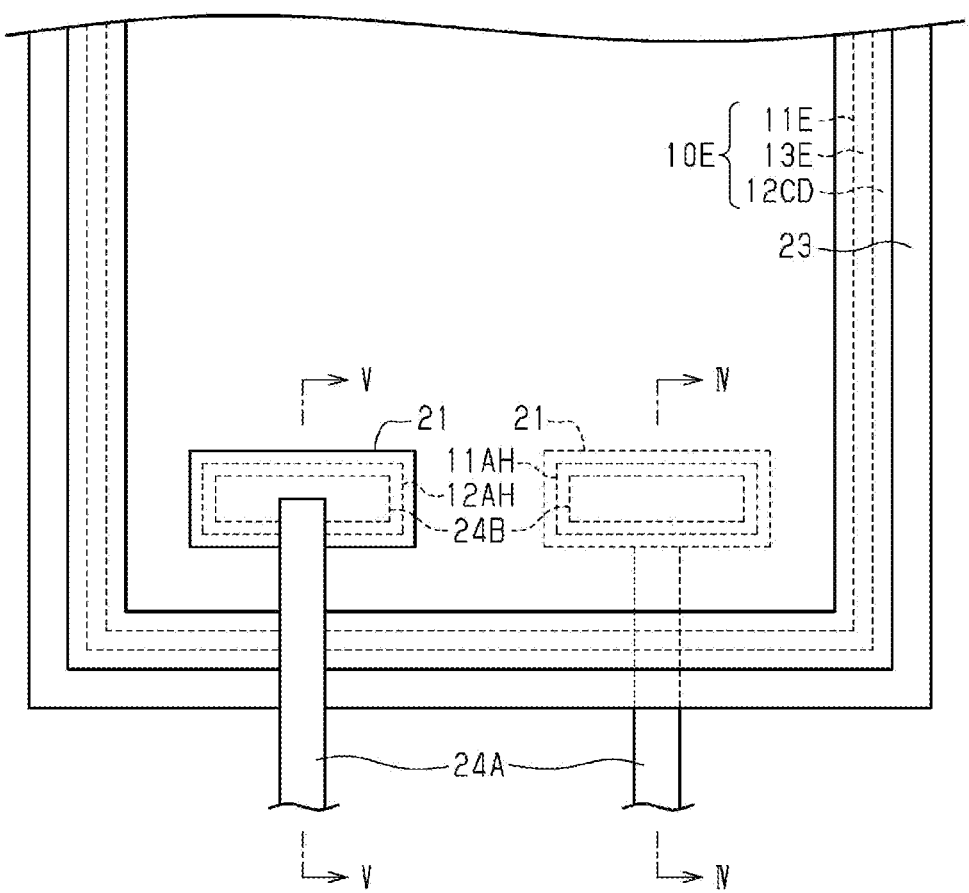
FIG. 3 is a partial enlarged plan view of a connection portion between a light control sheet and a driving unit in FIG. 1.

As shown in FIG. 3, the light control sheet 10 has a first opening part 11AH that opens to the front surface 10F and a second opening part 12AH that opens to the back surface 10B. The light control sheet 10 is connected to the driving unit 24 through the first opening part 11AH and the second opening part 12AH. The first opening part 11AH and the second opening part 12AH are located inside the first film end surface 11E. The outermost periphery of the first film 11 has a frame shape when viewed from a position facing the front surface 10F. When viewed from the position facing the front surface 10F, the first opening part 11AH and the second opening part 12AH are not in contact with the outermost periphery of the first film 11 and are located in a region surrounded by the first film 11.

Figure 4:
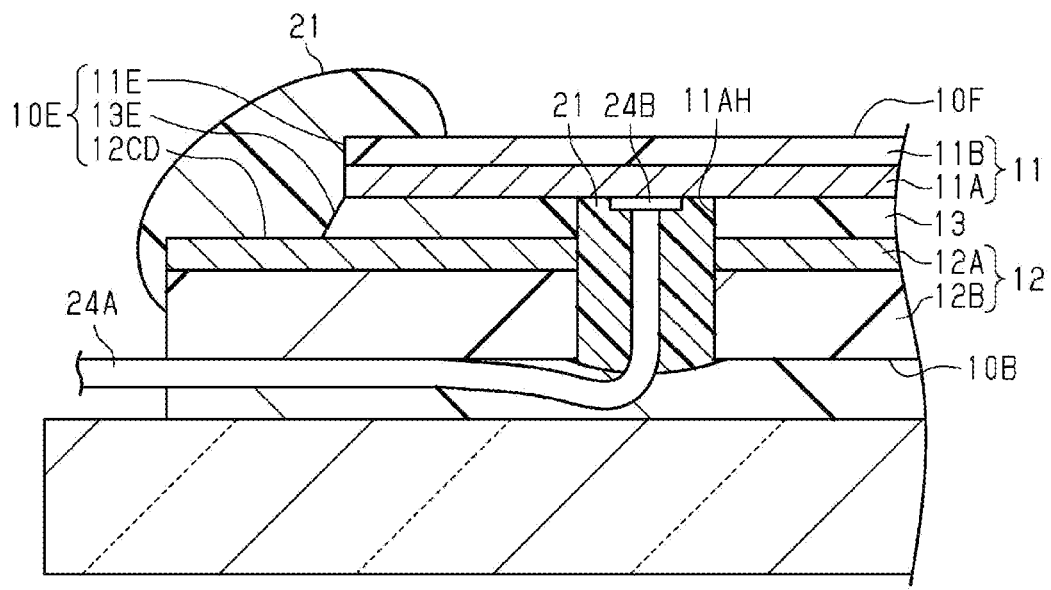
FIG. 4 is a cross-sectional view taken along line IV-IV in FIG. 3.
Figure 5:
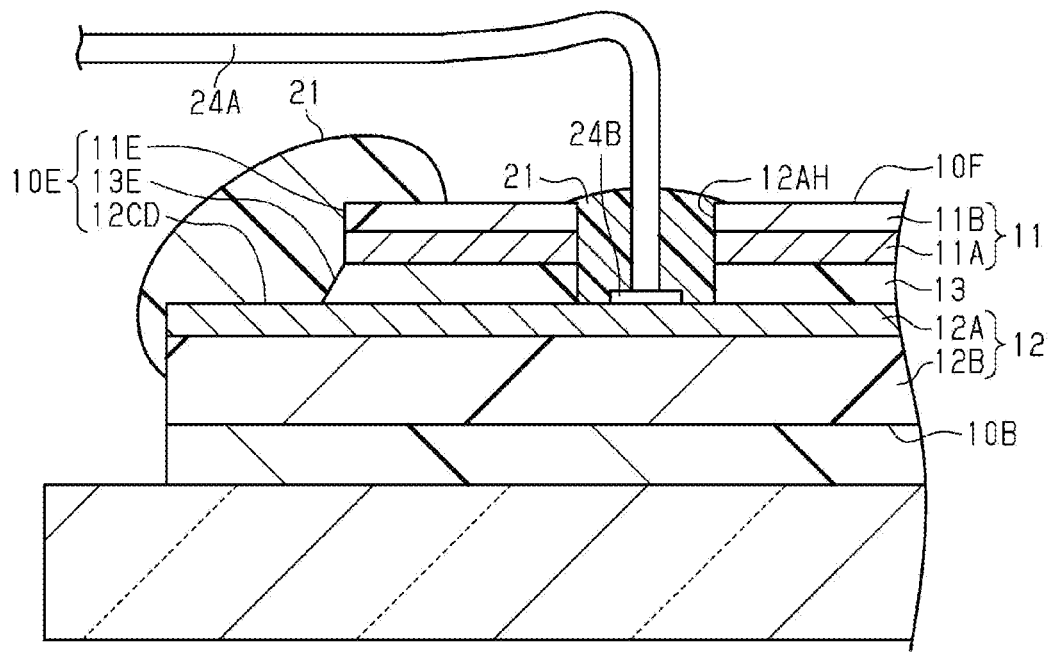
FIG. 5 is a cross-sectional view taken along line V-V in FIG. 3.

As shown in FIGS. 4 and 5, the first opening part 11AH is a bottomed hole that opens to the back surface 10B and extends to the transparent electrode layer 11A of the first film 11. That is, the first opening part 11AH is a bottomed hole extending from the back surface 10B to the first film contact surface 11C. The first opening part 11AH is formed by removing a portion of the second film 12 and a portion of the liquid crystal layer 13 from the back surface 10B side of the light control sheet 10.

The second opening part 12AH is a bottomed hole that opens to the front surface 10F and extends to the transparent electrode layer 12A of the second film 12. That is, the second opening part 12AH is a bottomed hole extending from the front surface 10F to the second film contact surface 12C. The second opening part 12AH is formed by removing a portion of the first film 11 and a portion of the liquid crystal layer 13 from the front surface 10F side of the light control sheet 10.

While the sealant 21 covers the entire periphery of the liquid crystal end surface 13E, each of the transparent electrode layers 11A and 12A and external wiring can be connected through the respective opening parts 11AH and 12AH without physically interfering with the sealant 21.

The transparent electrode layers 11A and 12A are each connected to the driving unit 24 via a conductor part 24A and an adhesive part 24B. The conductor part 24A is connected to the driving unit 24. The adhesive part 24B adheres the conductor part 24A to the transparent electrode layers 11A and 12A. The first opening part 11AH and the second opening part 12AH are filled with a sealant 21. The conductor part 24A may be, for example, a flexible printed circuit board, and the adhesive part 24B may be, for example, an anisotropic conductive film. Alternatively, the conductor part 24A may be, for example, a lead wire, and the adhesive part 24B may be, for example, solder.

In the light control sheet 10 described above, the sealant 21 that covers the liquid crystal end surface 13E is supported by the liquid crystal end surface 13E and the second film outer peripheral part 12CD, which is continuous with the liquid crystal end surface 13E. The liquid crystal end surface 13E and the second film outer peripheral part 12CD are surfaces that are continuous with each other, but spread in directions different from each other. Therefore, for example, even when the area of the liquid crystal end surface 13E has a size that makes it difficult for the liquid crystal end surface 13E to be easily covered with the sealant 21 provided to the liquid crystal end surface 13E, the provision of the sealant 21 is facilitated by the amount of the area of the second film outer peripheral part 12CD and by the amount of the difference in the spreading direction between the liquid crystal end surface 13E and the second film outer peripheral part 12CD.

In other words, the sealant 21 that covers the edge portion of the liquid crystal layer 13 is supported by the edge portion of the liquid crystal layer 13 and the second film outer peripheral part 12CD, which is continuous from the edge portion of the liquid crystal layer 13. The edge portion of the liquid crystal layer 13 and the second film outer peripheral part 12CD are surfaces that are continuous with each other and spread in mutually different directions. Therefore, even when the area of the edge portion of the liquid crystal layer 13 is so small that it is difficult for the edge portion to be easily covered with the sealant 21, an area of contact between the light control sheet 10 and the sealant 21 can be increased by the amount of the area of the second film outer peripheral part 12CD. In addition, the area of contact between the light control sheet 10 and the sealant 21 can be increased by the amount of the difference in the spreading direction between the edge portion of the liquid crystal layer 13 and the second film outer peripheral part 12CD, without increasing the thickness of the light control sheet 10. As a result, it becomes easy to cover the end portion of the light control sheet 10 with the sealant 21.

Further, since the liquid crystal end surface 13E and the second film outer peripheral part 12CD have a shape facing a position facing the front surface 10F, the work of covering the liquid crystal end surface 13E with the sealant 21 can be performed over an entire periphery of the light control sheet 10 only from the position facing the front surface 10F.

As above, according to the foregoing embodiment, the following advantageous effects are obtained.

(1) The sealant 21 that covers the liquid crystal end surface 13E is supported by the liquid crystal end surface 13E and the second film outer peripheral part 12CD, which is continuous with the liquid crystal end surface 13E. The liquid crystal end surface 13E and the second film outer peripheral part 12CD are surfaces that are continuous with each other, but spread in directions different from each other. Therefore, the area of contact between the light control sheet 10 and the sealant 21 can be increased by the amount of the area of the second film outer peripheral part 12CD. The area of contact between the light control sheet 10 and the sealant 21 can also be increased by the amount of the difference in the spreading direction between the liquid crystal end surface 13E and the second film outer peripheral part 12CD, without increasing the thickness of the light control sheet 10. As a result, it is possible to suppress deterioration in characteristics of the liquid crystal layer 13 from the state immediately after processing of the light control sheet in which it is provided with the second film outer peripheral part 12CD.

(2) Covering of the liquid crystal end surface 13E with the sealant 21 is facilitated by the amount by which the width of the second film outer peripheral part 12CD is greater than or equal to the sum of the thickness of the first film 11 and the thickness of the liquid crystal layer 13.

(3) Since the sealant 21 can be provided over the entire periphery of the light control sheet 10 only from a position facing the front surface 10F, the load of the work of covering the sealant 21 is reduced. Further, since the accuracy of the work of coating with the sealant 21 can also be improved, more beneficial effects are exhibited when the light control sheet 10 is widely used.

(4) When viewed from a position facing the front surface 10F, the liquid crystal end surface 13E does not overlap the first film 11, and faces the position facing the front surface 10F from the periphery of the first film 11. Further, the angle θ11 formed by the first liquid crystal contact surface 13C1 and the virtual line connecting the end point of the first liquid crystal contact surface 13C1 and an arbitrary point on the first film end surface 11E is 90° or less. The angle θ13 formed by the liquid crystal end surface 13E and the second liquid crystal contact surface 13C2 is less than 90°. As a result, the distance between the first film end surface 11E and the second film outer peripheral part 12CD can be extended, and unintended short circuits between the transparent electrode layer 11A and the transparent electrode layer 12A can be suppressed.

(5) Since the liquid crystal end surface 13E and the second film outer peripheral part 12CD have a shape facing a position facing the front surface 10F when viewed from the position facing the front surface 10F, it is possible to provide the sealant 21 over the entire periphery of the light control sheet 10 only from the front surface 10F side.

(6) The light control sheet 10 has opening parts inside the outer edge of the first film 11, and the transparent electrode layers 11A and 12A and the driving unit 24 are connected to each other through the opening parts. Therefore, it is possible to connect the light control sheet 10 and the driving unit 24 while maintaining the sealing of the sheet end portion 10E.

(7) The first opening part 11AH leading to the transparent electrode layer 11A opens to the back surface 10B of the light control sheet 10, and the second opening part 12AH leading to the transparent electrode layer 11A opens to the front surface 10F of the light control sheet 10. Therefore, when the transparent electrode layer 11A and the driving unit 24 are connected, the transparent electrode layer 11A is supported by the transparent support film 11B. In addition, when the transparent electrode layer 12A and the driving unit 24 are connected, the transparent electrode layer 12A is supported by the transparent support film 12B. That is, the pressing force toward each of the transparent electrode layers 11A and 12A when connecting the transparent electrode layers 11A and 12A and the driving unit 24 does not crush other layers such as the liquid crystal layer 13. Therefore, it is possible to apply a sufficient pressing force for connection between each of the transparent electrode layers 11A and 12A and the driving unit 24.

The embodiment described above may be modified and implemented as follows.

The width L of the second film outer peripheral part 12CD may be less than the sum of the thickness T1 of the first film 11 and the thickness T3 of the liquid crystal layer 13. In short, as long as the second film contact surface 12C includes the second film outer peripheral part 12CD, it is possible to obtain the same or substantially the same effect as that in the above (1).

Other than the configuration that the angle θ13 formed by the liquid crystal end surface 13E and the second liquid crystal contact surface 13C2 is equal at each point on the liquid crystal end surface 13E, it is possible to obtain the same or substantially the same effect as that in the above (4) as long as the angle θ13 formed by the second liquid crystal contact surface 13C2 and the virtual line connecting two arbitrary points on the liquid crystal end surface 13E is less than 90°. That is, the electrical connection between the two transparent electrode layers 11A and 12A can also be suppressed by the amount by which the angle θ13 formed by the second liquid crystal contact surface 13C2 and the virtual line connecting two arbitrary points on the liquid crystal end surface 13E is less than 90°.

For example, the first condition is that the angle formed by the second liquid crystal contact surface 13C2 and the virtual line connecting two arbitrary points on the liquid crystal end surface 13E is less than 90°. As long as the first condition is satisfied, the liquid crystal end surface 13E may have an arc shape that gently projects outward of the light control sheet 10 or an arc shape that is gently recessed toward the inside of the light control sheet 10 in cross section perpendicular to the front surface 10F.

The sealant 21 does not have to cover the entire sheet end portion 10E, and a part of the second film outer peripheral part 12CD may be exposed from the sealant 21, from the periphery of the region of the sheet end portion 10E covered with the sealant 21. That is, as long as the sealant 21 covers the liquid crystal end surface 13E and the region adjacent to the liquid crystal end surface 13E, it is possible to obtain the same or substantially the same effects as those in the above (1) to (7). However, from the viewpoint of allowing the sheet end portion 10E to be easily covered with the sealant 21 by increasing the contact area between the sheet end portion 10E and the sealant 21, the sealant 21 preferably covers the entire sheet end portion 10E.

Figure 6A:
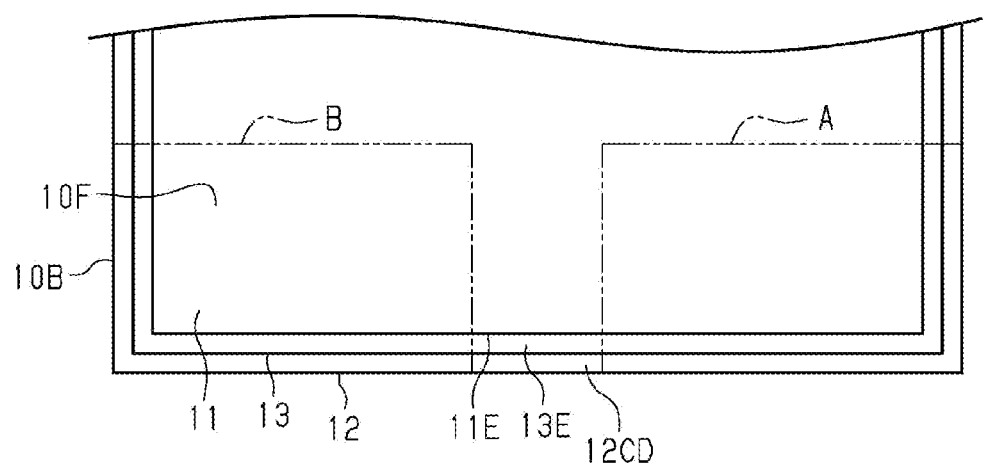
FIGS. 6A, 6B, and 6C are plan views illustrating an example of a method of connecting a light control sheet and a driving unit.
Figure 6B:
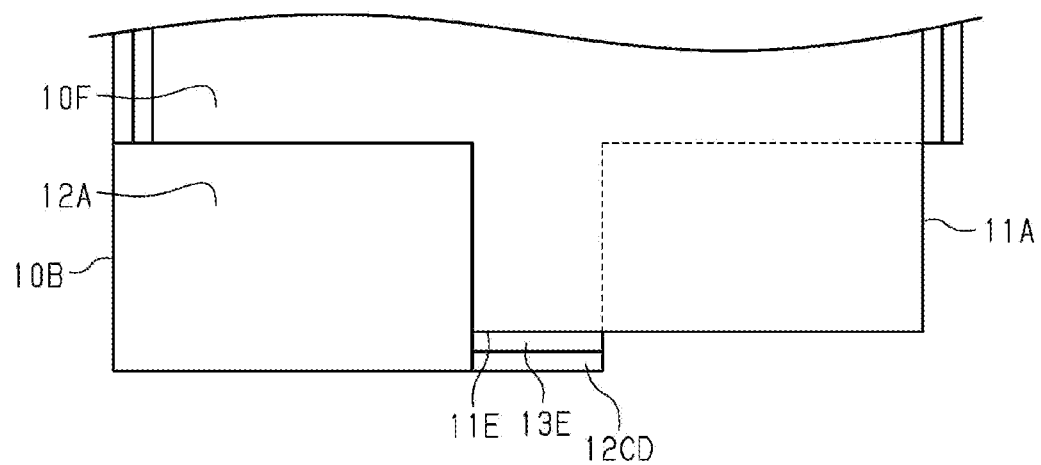
Figure 6C:
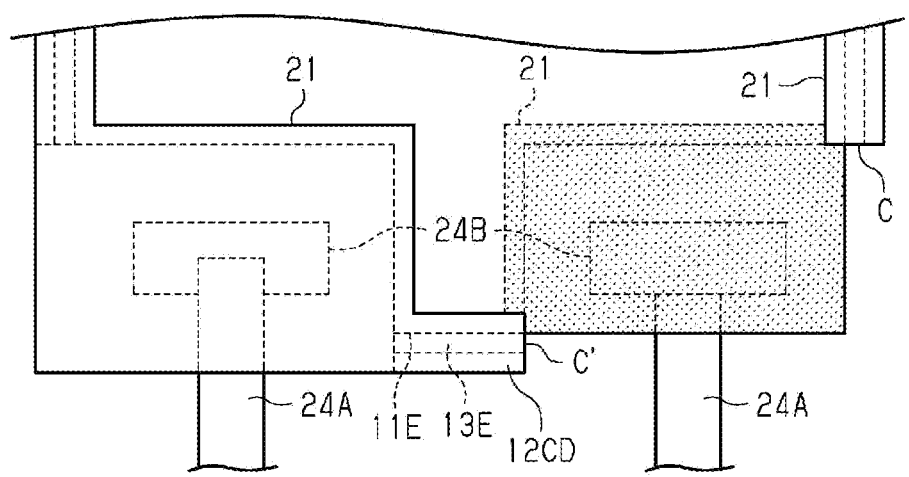

The light control sheet 10 and the driving unit 24 may be connected as shown in FIGS. 6A, 6B, and 6C. Specifically, first, as shown in FIG. 6A, a part of the second film 12 and a part of the liquid crystal layer 13 are removed in a region defined by a processing line A from the back surface 10B side. Further, a part of the first film 11 and a part of the liquid crystal layer 13 are removed in a region defined by a processing line B from the front surface 10F side. As a result, as shown in FIG. 6B, the transparent electrode layers 11A and 12A are partially exposed. Then, as shown in FIG. 6C, the driving unit 24 is connected to the light control sheet 10. Finally, the sheet end portion 10E and exposed parts of the transparent electrode layers 11A and 12A are covered by the sealant 21. In FIG. 6C, dots are used to mark the sealant 21 that covers the transparent electrode layer 11A exposed toward a position facing the back surface 10B.

With the above method, the following effect can be obtained in place of the effect in the above (5). Specifically, the method makes it possible to more easily expose a portion of the transparent electrode layers 11A and 12A as compared with the above method of forming the opening parts 11AH and 12AH in the light control sheet 10.

As shown in FIG. 6C, in the above configuration, the covering provided by the sealant 21 is discontinuous at a cut surface C and a cut surface C' of the sheet end portion 10E. Therefore, from the viewpoint of enhancing the sealing at the sheet end portion 10E, the light control sheet 10 preferably includes the opening parts 11AH and 12AH.

The first opening part 11AH is formed by removing only the transparent support film 11B when viewed from a position facing the front surface 10F of the light control sheet 10, whereby the first opening part 11AH may be embodied as a bottomed hole extending from the front surface 10F to the transparent electrode layer 11A.

The second opening part 12AH is formed by removing only the transparent support film 12B when viewed from a position facing the back surface 10B of the light control sheet 10, whereby the second opening part 12AH may be embodied as a bottomed hole extending from the back surface 10B to the transparent electrode layer 12A. According to this modification as well, the same or substantially the same effect as that in the above (5) can be obtained.

Figure 7:
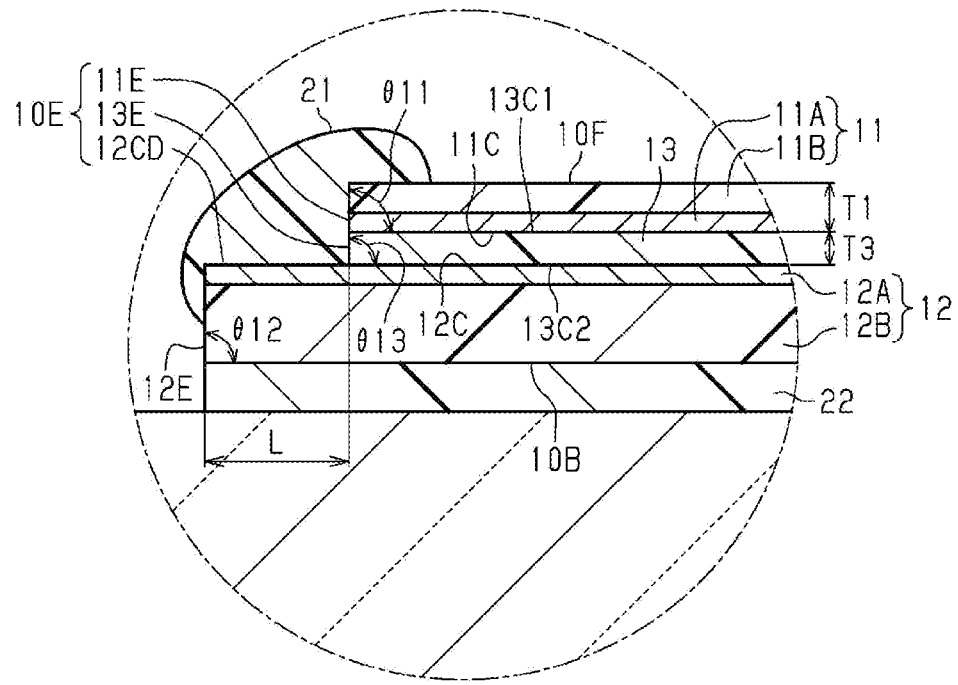
FIG. 7 is a cross-sectional view of a light control device according to a first modification.

As shown in FIG. 7, in cross section perpendicular to the front surface 10F, the angle θ11 formed by the first film end surface 11E and the first film contact surface 11C may be 90°, and the angle θ13 formed by the liquid crystal end surface 13E and the second liquid crystal contact surface 13C2 may be 90°. That is, in cross section perpendicular to the front surface 10F, the first film end surface 11E and the liquid crystal end surface 13E may be located on a single straight line perpendicular to the front surface 10F.

According to this modification, it is possible to easily form the sheet end portion 10E. Further, effective expansion of the liquid crystal end surface 13E and therefore covering of the end portion of the light control sheet 10 with the sealant 21 are further facilitated by the amount of the area of the first film end surface 11E and by the amount by which the first film end surface 11E and the liquid crystal end surface 13E can be regarded as a single plane.

Figure 8:
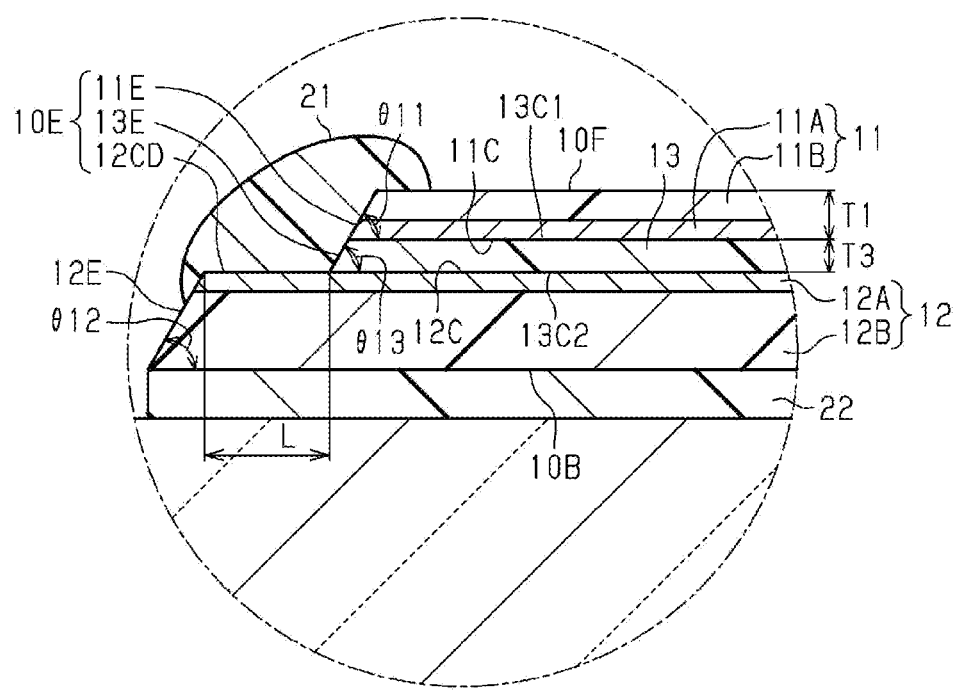
FIG. 8 is a cross-sectional view of a light control device according to a second modification.

As shown in FIG. 8, the entire first film end surface 11E may have a shape facing a position facing the front surface 10F. In other words, the entire first film end surface 11E may project outward from the front surface 10F when viewed from a viewpoint opposed to any position on the outermost periphery of the front surface 10F. That is, in cross section perpendicular to the front surface 10F, the angle θ11 formed by the first film end surface 11E and the first film contact surface 11C may be less than 90°. That is, in cross section perpendicular to the front surface 10F, the first film end surface 11E and the liquid crystal end surface 13E may be located on a single straight line inclined relative to the front surface 10F.

Further, the entire second film end surface 12E may have a shape facing a position facing the front surface 10F. In other words, the entire second film end surface 12E may project outward from the second film contact surface 12C even when viewed from a viewpoint opposed to any position on the outermost periphery of the second film contact surface 12C. That is, the angle θ12 formed by the second film end surface 12E and the back surface 10B may be less than 90° in cross section perpendicular to the front surface 10F.

According to these modifications, it is possible to further enhance the adhesion between the light control sheet 10 and the sealant 21 because the contact area between the light control sheet 10 and the sealant 21 is further increased, as compared with the configuration that the angle θ11 formed by the virtual line on the first film end surface 11E and the first film contact surface 11C is 90°. The same effects can be obtained with respect to the liquid crystal end surface 13E and the second film end surface 12E as well.

Further, according to each modification, the contact area between the light control sheet 10 and the sealant 21 can be further increased to further enhance the adhesion between the light control sheet 10 and the sealant 21.

In cross section perpendicular to the front surface 10F, the first film end surface 11E and the liquid crystal end surface 13E do not have to form straight lines continuous with each other. That is, even when the angle θ11 formed by the first film end surface 11E and the first film contact surface 11C and the angle θ13 formed by the liquid crystal end surface 13E and the second liquid crystal contact surface 13C2 are different, the same or substantially the same effects as the above effects can be obtained.

Other than the case where the angle θ11 formed by the first film end surface 11E and the first liquid crystal contact surface 13C1 is equal at each point on the first film end surface 11E, that is, 90°, the light control sheet 10 may include a portion where the angle formed by the virtual line connecting two arbitrary points on the first film end surface 11E and the first film contact surface 11C is less than 90°. In this case, in the portion where the angle formed by the virtual line connecting two arbitrary points on the first film end surface 11E and the first film contact surface 11C is less than 90°, the first film end surface 11E may have an arc shape that gently projects outward or an arc shape that is gently recessed inward in cross section perpendicular to the front surface 10F. Also in this case, the same or substantially the same effects as the above effects can be obtained.

In this case, the contact area between the light control sheet 10 and the sealant 21 can be further increased to further enhance the adhesion between the light control sheet 10 and the sealant 21.

Other than the case where the angle θ12 formed by the second film end surface 12E and the back surface 10B is equal at each point on the second film end surface 12E, that is, 90°, the light control sheet 10 may include a portion where the angle formed by the virtual line connecting two arbitrary points on the second film end surface 12E and the second film contact surface 12C is less than 90°. In this case, in the portion where the angle formed by the virtual line connecting two arbitrary points on the second film end surface 12E and the second film contact surface 12C is less than 90°, the second film end surface 12E may have an arc shape that gently projects outward or an arc shape that is gently recessed inward in cross section perpendicular to the front surface 10F. Also in this case, the same or substantially the same effects as the above effects can be obtained.

In this case, the contact area between the light control sheet 10 and the sealant 21 can be further increased to further enhance the adhesion between the light control sheet 10 and the sealant 21.

In cross section perpendicular to the front surface 10F, an inner side surface of each of the opening parts 11AH and 12AH, that is, a side surface that defines each of the opening parts 11AH and 12AH may have a shape such that the end surface of the liquid crystal layer 13 and the end surfaces of the films 11 and 12 are inclined relative to the transparent electrode layers 11A and 12A, as is the case with the sheet end portion 10E shown in FIG. 2 or FIG. 8. That is, at least part of the side surface of the first opening part 11AH may face a position opposed to the first opening part 11AH when viewed from the position facing the first opening part 11AH. That is, at least part of the side surface of the first opening part 11AH may project inward from the opening of the first opening part 11AH located on the back surface 10B. At least part of the side surface of the second opening part 12AH may face a position opposed to the second opening part 12AH when viewed from the position facing the second opening part 12AH. That is, at least part of the side surface of the second opening part 12AH may project inward from the opening of the second opening part 12AH located on the front surface 10F.

At this time, the side surface of the first opening part 11AH is constituted by cut surfaces of the liquid crystal layer 13 and the second film 12. The cut surfaces are formed by removing a part of the liquid crystal layer 13 and a part of the second film 12. The side surface of the second opening part 12AH is constituted by cut surfaces of the first film 11 and the liquid crystal layer 13. The cut surfaces are formed by removing a part of the first film 11 and a part of the liquid crystal layer 13.

According to the above configuration, the area of contact between the sealant 21 filled in the opening parts 11AH and 12AH and the side surface of each of the opening parts 11AH and 12AH is increased by the amount by which the side surface of each of the opening parts 11AH and 12AH is inclined relative to each of the transparent electrode layers 11A and 12A. As a result, the adhesion between the sealant 21 and the light control sheet 10 can be enhanced even at each of the opening parts 11AH and 12AH.

Further, in this case, it is possible to improve the adhesion between the side surface of each of the opening parts 11AH and 12AH and the sealant 21 covering each of the opening parts 11AH and 12AH. As a result, the sealing of the liquid crystal layer 13 can be enhanced even in the opening parts 11AH and 12AH required for connecting the respective transparent electrode layers 11A and 12A and the external wiring.

Figure 9:
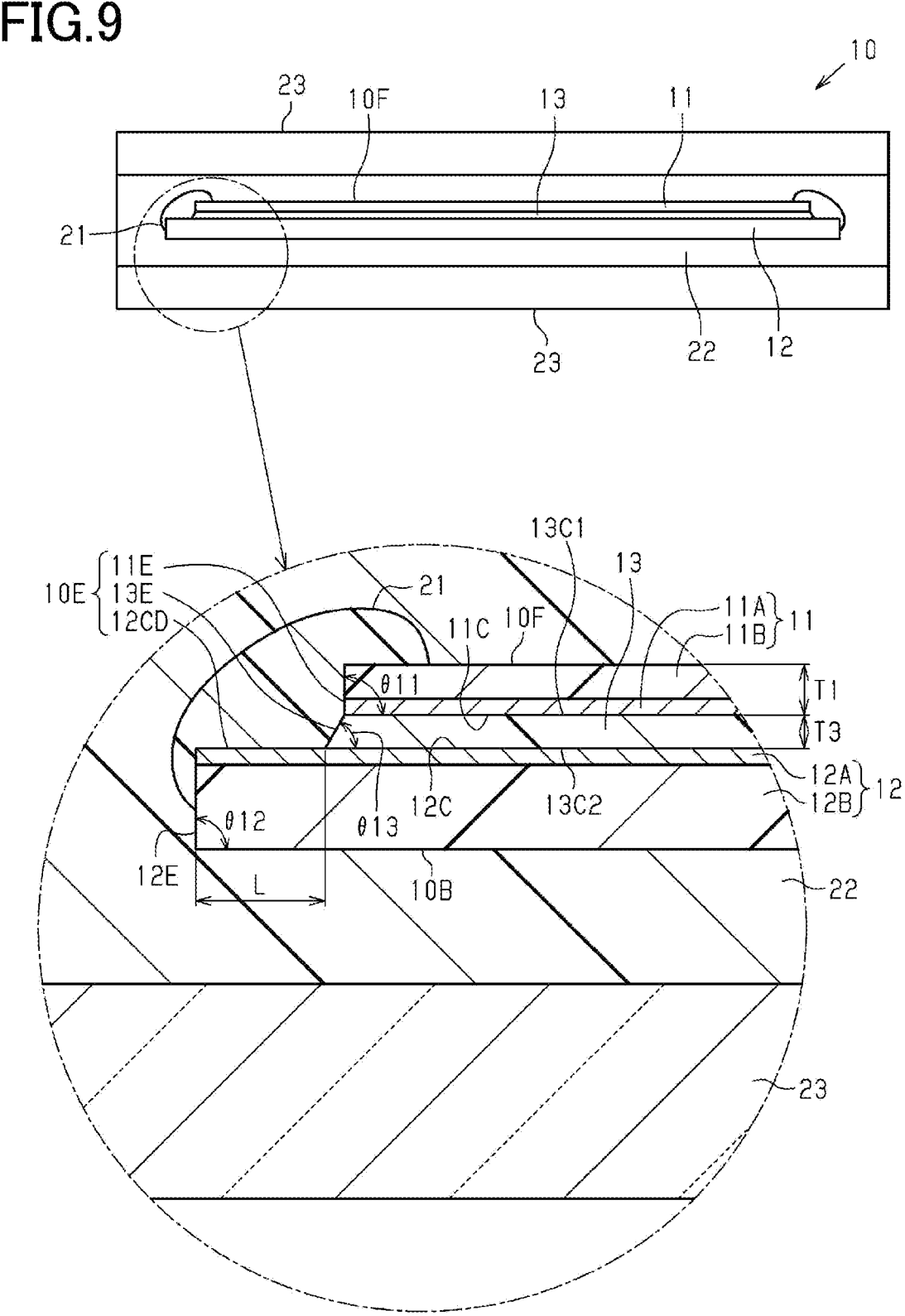
FIG. 9 is a cross-sectional view illustrating a light control device according to a third modification with part thereof shown enlarged.

As shown in FIG. 9, the light control sheet 10 may be enclosed between the transparent adhesive layers 22 located between the pair of transparent supports 23 by being held between the pair of transparent supports 23.

The transparent adhesive layer 22 is formed of a material having adhesive force and light-transmitting properties. The transparent adhesive layer 22 may be formed of, for example, ethylene vinyl acetate (EVA) or polyvinyl butyral (PVB). The transparent adhesive layer 22 contains a plasticizer. When the light control sheet 10 is held between the pair of transparent supports 23, the light control sheet 10 is held between the transparent adhesive layer 22 formed on one transparent support 23 and the transparent adhesive layer 22 formed on the other transparent support 23, and then heated and pressure-bonded. The pair of heated transparent adhesive layers 22 are melted together to enclose the light control sheet 10 therebetween. Also in this modification, the same or substantially the same effects as the above effects can be obtained.

The present application addresses the following. The deterioration in characteristics of the liquid crystal layer described in the background does not start when performing work for attaching the light control sheet to the window glass or the like, but starts immediately after processing of the light control sheet. Therefore, the light control sheet is required to be covered, at its end portion and the like, with a sealant prior to performing work for attaching the light control sheet.

On the other hand, in order to adapt it to diverse shapes of the support and various usage scenarios of the light control sheet, reduction in thickness of the light control sheet is steadily progressing, and the liquid crystal layer and the transparent film have a thickness of less than 1 mm. As a result, an area of an edge portion of the liquid crystal layer and an area of an end surface of the transparent film have a size that makes it difficult for the edge portion and the end surface to be easily covered with sealant, when providing the sealant to the edge portion and the end surface.

An aspect of the present invention is to provide a light control sheet and a light control device in which an edge portion of a liquid crystal layer can be easily covered with a sealant.

A light control sheet includes a first film having a front surface of the light control sheet and including a transparent electrode layer; a second film having a back surface of the light control sheet and including a transparent electrode layer; a liquid crystal layer located between the first film and the second film; and a sealant covering an edge portion of the liquid crystal layer. The second film has a second film contact surface facing away from the back surface and including a portion in contact with the liquid crystal layer. When viewed from a position facing the front surface, the second film contact surface includes a second film outer peripheral part that is located along the edge portion of the liquid crystal layer, does not overlap the first film or the liquid crystal layer, and faces the position facing the front surface. The sealant is supported by the second film outer peripheral part.

According to the configuration described above, the sealant covering the edge portion of the liquid crystal layer is supported not only by the edge portion of the liquid crystal layer but also by the second film outer peripheral part continuous from the end surface. The edge portion of the liquid crystal layer and the second film outer peripheral part are surfaces that are continuous with each other and spread in mutually different directions. Therefore, even when the area of the edge portion of the liquid crystal layer is so small that it is difficult for the edge portion to be easily covered with the sealant, an area of contact between the light control sheet and the sealant can be increased by the amount of the area of the second film outer peripheral part. In addition, the area of contact between the light control sheet and the sealant can be increased by the amount of the difference in the spreading direction between the edge portion of the liquid crystal layer and the second film outer peripheral part, without increasing the thickness of the light control sheet. As a result, it becomes easy to cover the end portion of the light control sheet with the sealant.

Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
   a light control sheet body having a front surface and a back surface opposite to the front surface and comprising a first film having the front surface, a second film having the back surface, a liquid crystal layer formed between the first film and the second film, and a sealant covering an edge portion of the liquid crystal layer,
   wherein each of the first film and the second film includes a transparent electrode layer, the second film has a second film contact surface such that the second film contact surface includes a portion in contact with the liquid crystal layer, and a second film outer peripheral part surrounding the portion in contact with the liquid crystal layer and having the sealant entirely covering the second film outer peripheral part, the light control sheet body is formed such that the second film outer peripheral part of the second film is extended along the edge portion of the liquid crystal layer and does not overlap the first film and the liquid crystal layer, and the second film outer peripheral part has a width greater than or equal to a sum of a thickness of the first film and a thickness of the liquid crystal layer.

2. The light control sheet according to claim 1, wherein the first film has a first film contact surface in contact with the liquid crystal layer, the liquid crystal layer has a first liquid crystal contact surface in contact with the first film, a second liquid crystal contact surface in contact with the second film, and a liquid crystal end surface which connects the first liquid crystal contact surface and the second liquid crystal contact surface in an end portion of the liquid crystal layer.

3. The light control sheet according to claim 2, wherein the first film has a first film end surface in an end portion thereof, and the first film end surface and the liquid crystal end surface have a fusing mark.

4. The light control sheet according to claim 3, wherein the liquid crystal end surface does not overlap the first film.

5. The light control sheet according to claim 3, wherein the first film end surface forms an inclined surface, and the sealant covers the first film end surface.

6. The light control sheet according to claim 3, wherein the second film end surface forms an inclined surface, and the sealant covers the second film end surface.

7. The light control sheet according to claim 3, wherein the second liquid crystal contact surface and a virtual line connecting two points on the liquid crystal end surface form an angle of less than 90°.

8. The light control sheet according to claim 3, wherein, in the cross section along the first direction, the first film contact surface and a virtual line connecting two points on the first film end surface form an angle of less than 90°, and the sealant covers the first film end surface.

9. The light control sheet according to claim 3, wherein the back surface and a virtual line connecting two points on the second film end surface form an angle of less than 90°, and the sealant covers the second film end surface.

10. The light control sheet according to claim 2, wherein the first film has a first film end surface formed on a same plane with the liquid crystal end surface, and the sealant covers the first film end surface and the liquid crystal end surface.

11. The light control sheet according to claim 2, wherein the light control sheet body includes a first opening part which extends from the back surface to the transparent electrode layer of the first film and a second opening part which extends from the front surface to the transparent electrode layer of the second film, the first opening part and the second opening part are formed in a region between two first film end surfaces, and the sealant covers an entire periphery of the edge portion of the liquid crystal layer.

12. The light control sheet according to claim 11, wherein the first opening part has a side surface covered with a sealant.

13. The light control sheet according to claim 1, wherein the light control sheet body includes a first opening part which extends from the back surface to the transparent electrode layer of the first film and a second opening part which extends from the front surface to the transparent electrode layer of the second film, the first opening part and the second opening part are formed in a region between two first film end surfaces, and the sealant covers an entire periphery of the edge portion of the liquid crystal layer.

14. The light control sheet according to claim 13, wherein the first opening part has a side surface covered with a sealant.

15. The light control sheet according to claim 13, wherein the second opening part has a side surface which faces the first direction, and the side surface of the second opening part is covered with a sealant.

16. A light control device, comprising:
   the light control sheet of claim 1;
   a transparent support supporting the light control sheet; and
   an adhesive layer formed between the light control sheet and the transparent support.

17. A light control device, comprising:
   the light control sheet of claim 1;
   a plurality of transparent supports that hold the light control sheet therebetween in a thickness direction of the light control sheet; and
   an adhesive layer formed between the light control sheet and each of the transparent supports.

18. A light control sheet, comprising:
a light control sheet body having a front surface and a back surface opposite to the front surface and comprising a first film having the front surface, a second film having the back surface, a liquid crystal layer formed between the first film and the second film, and a sealant covering an edge portion of the liquid crystal layer,
wherein each of the first film and the second film includes a transparent electrode layer, the second film has a second film contact surface such that the second film contact surface includes a portion in contact with the liquid crystal layer, and a second film outer peripheral part surrounding the portion in contact with the liquid crystal layer and having the sealant entirely covering the second film outer peripheral part, the light control sheet body is formed such that the second film outer peripheral part of the second film is extended along the edge portion of the liquid crystal layer and does not overlap the first film and the liquid crystal layer, the light control sheet body includes a first opening part which extends from the back surface to the transparent electrode layer of the first film and a second opening part which extends from the front surface to the transparent electrode layer of the second film, the first opening part and the second opening part are formed in a region between two first film end surfaces, and the sealant covers an entire periphery of the edge portion of the liquid crystal layer.

19. The light control sheet according to claim 18, wherein the first opening part has a side surface covered with a sealant.

20. The light control sheet according to claim 18, wherein the second opening part has a side surface which faces the first direction, and the side surface of the second opening part is covered with a sealant.

* * * * *